US012045461B2

(12) United States Patent
Bert (10) Patent No.: US 12,045,461 B2
(45) Date of Patent: Jul. 23, 2024

(54) TEMPORAL METRIC DRIVEN MEDIA MANAGEMENT SCHEME

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 17/876,355

(22) Filed: Jul. 28, 2022

(65) Prior Publication Data

US 2024/0036725 A1 Feb. 1, 2024

(51) Int. Cl.
*G06F 3/06* (2006.01)

(52) U.S. Cl.
CPC .......... *G06F 3/0604* (2013.01); *G06F 3/0619* (2013.01); *G06F 3/0652* (2013.01); *G06F 3/0673* (2013.01)

(58) Field of Classification Search
CPC .... G06F 3/0604; G06F 3/0616; G06F 3/0619; G06F 3/064; G06F 3/0649; G06F 3/0652; G06F 3/0673; G06F 3/0679

USPC ........................................................ 711/154
See application file for complete search history.

(56) References Cited

U.S. PATENT DOCUMENTS

| 11,163,446 | B1* | 11/2021 | Wils ..................... G06F 16/2358 |
| 2007/0156998 | A1* | 7/2007 | Gorobets ............ G06F 12/0246 711/170 |
| 2009/0248964 | A1* | 10/2009 | Yano ....................... G06F 3/061 711/E12.001 |
| 2018/0260132 | A1* | 9/2018 | Wang .................. G06F 12/0246 |
| 2020/0174668 | A1* | 6/2020 | Byun .................. G06F 12/0253 |

* cited by examiner

*Primary Examiner* — Hashem Farrokh
(74) *Attorney, Agent, or Firm* — Lowenstein Sandler LLP (57) ABSTRACT

A victim management unit (MU) for performing a media management operation is identified. The victim MU stores valid data. An ordered set cursors is maintained. A source cursor of the ordered set of cursors associated with the victim MU is identified. A target cursor of the ordered set of cursors referencing one or more available MUs is identified as the cursor following the source cursor in the ordered set of cursors. The valid data is associated with the identified target cursor.

20 Claims, 7 Drawing Sheets

TEMPORAL METRIC DRIVEN MEDIA MANAGEMENT SCHEME

TECHNICAL FIELD

Embodiments of the disclosure relate generally to memory sub-systems, and more specifically, relate to a temporal metric driven media management scheme.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to a temporal metric driven media management scheme. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane can include of a set of physical blocks. Each block can include of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

For some memory devices, such as NAND devices, blocks are the smallest units than can be erased, and thus pages within the blocks cannot be erased individually. A page of a block can contain valid data, invalid data, or no data. Invalid data is data that is marked as outdated as a new version of the data is stored on the memory device and/or is marked for erasure. Valid data is the most recent version of such data being stored on the memory device. A page that does not contain data can be a page that has been previously erased, or that has not yet been written to.

Although memory devices store data in pages and blocks of particular sizes, the memory sub-system can provide support for units of other sizes, and map the units to pages or physical blocks. Each such unit is referred to herein as a management unit, and can be, for example, a physical page, a physical block, a host logical block, a multiple of a physical block, or other suitable size. The data stored in each management unit can include metadata and/or host data.

The host system can provide data to be stored at the memory sub-system, which the memory sub-system controller can store as management units. The data provided by the host system can be written (or overwritten) at varying rates, which can be represented using a temporal metric. The temporal metric can represent an age characteristic of valid data. The age characteristic can be, for example, the amount of time that has elapsed since the data was programmed to a cell (known as time after programming, or TAP), the number of valid accesses (e.g., writes) by the host system, the frequency of accesses corresponding the data, a timestamp indicating the most recent access of the valid data, or some other representation of the relative age of the data. Frequently-written data can have a high temporal metric value, and can include, for example, journals, file system metadata, and other frequently-updated data. Infrequently-written data can have a low temporal metric value, and can include, for example, operating system data that rarely changes, media files, and other data that is static or rarely updated. The temporal metric value of the data can reflect the likelihood that that the data will be overwritten, which can correspond to the age of the data. For example, data received directly from the host can have a high temporal metric value when it is received, and the longer it is stored untouched in the memory sub-system, the lower its temporal metric value becomes.

A memory sub-system controller can perform media management operations, such as wear leveling, refresh, garbage collection, scrub, etc. A management unit (e.g., a block or a superblock) can include one or more pages containing valid data while the remaining pages can contain invalid data. To avoid waiting for a threshold number of pages in the management unit to have invalid data in order to erase and reuse the management unit, the memory sub-system controller can perform garbage collection operations to allow the management unit to be erased and released as a free management unit for subsequent write operations. Garbage collection is a set of media management operations that include, for example, selecting a management unit that contains invalid data, identifying pages in the management unit that contain valid data, copying the valid data to new locations (e.g., free pages in another management unit), and erasing the selected management unit.

The additional re-write of valid data in the management units during a garbage collection operation results in a phenomenon referred to as write amplification. Write amplification manifests itself by the amount of physical data to be written to the storage media being a multiple of the logical amount of data manipulated by the host. The write amplification factor (WAF) is the ratio of the number of write operations that occur within the memory sub-system compared to the number of write operations that are received from the host system. For example, a WAF of five indicates that for every write operation received from the host system, the memory sub-system performs four additional back-end write operations related to media management. Furthermore, data exhibiting low values of a chosen temporal metric (e.g., commonly referred to as "cold" data) can be stored on the same memory management unit as data exhibiting higher values of the chosen temporal metric value (e.g., "hot" or "warm" data). The temporal metric can reflect, e.g., the time elapsed since the most recent access to the data, the frequency of updates of the data, etc. Unchanged cold data that is located on the same memory management units as hot data is likely to be copied to new management units numerous times by garbage collection operations because of changes to the hot data located on the same management units. Since cold data is unlikely to change, repeatedly writing and re-writing the cold data during garbage collection operations increases the WAF of the memory sub-system.

A memory device within a memory sub-system can perform a limited number of operations during its lifespan, and thus a high WAF can affect the endurance of the memory device. Furthermore, the operations performed by the memory sub-system controller during media management operations consume resources that could otherwise be used to perform write commands received from the host system. Thus, a high WAF can reduce response time and throughput, thus adversely affecting the overall performance of the memory sub-system. Write amplification is one of the leading issues affecting memory sub-systems.

Aspects of the present disclosure address the above-noted and other deficiencies by providing a memory sub-system that implements a media management scheme based on the temporal metric values of the valid data. As the memory sub-system controller receives a write command from a host system, the memory sub-system controller writes the data specified by the write command at a location referenced by a cursor. A cursor can be represented by a pointer that is maintained by the controller to reference the next available location (e.g., management unit) on the memory device. In some implementations, the controller can maintain multiple cursors corresponding to types of the data and/or operations to be performed (e.g., one or more host data cursors, one or more metadata cursors, one or more media management cursors, etc.). Each media management cursor can correspond to a range of values of a chosen temporal metric. For performing a media management operation, the controller can select a media management cursor based on the value of the temporal metric of the valid data of the management unit being garbage collected.

A garbage collection operation includes selecting a victim management unit (e.g., a block). Once the victim management unit is selected, the controller can read the valid data stored at the victim management unit. The controller can identify the value of the temporal metric of the valid data. The controller can then identify the media management cursor that corresponds to the value of the temporal metric. The controller can then store the valid data at the target management unit referenced by the identified media management cursor.

In some embodiments, the controller can maintain a sequential order of the media management cursors. Each media management cursor can be associated with a range of values of the temporal metric. For example, the temporal metric can reflect the number of times the data has been written and/or re-written (e.g., due to media management operations), and the ranges of values can refer to hot data, warm data, and cold data. The media management cursor referencing hot data can be associated with a range of temporal metric values above a high threshold; the media management cursor referencing cold data can be associated with a range of temporal metric values below a low threshold; and the media management cursor referencing warm data can be associated with a range of temporal metric values between the low and high thresholds.

Thus the controller can select the appropriate media management cursor using the sequential order. For example, the media management cursor referencing "warm" data can be first in the sequential order, the media management cursor referencing "cool" data can be the second in the sequential order, and the media management cursor referencing "cold" data can be the third in the sequential order. Note that there can be more than or fewer than three media management cursors. Metadata associated with the selected victim management unit can include an identifier of the source cursor used to write the data to the management unit. Thus, in selecting a target media management cursor, the memory sub-system controller can identify the cursor in the sequential order immediately following the source cursor. The memory sub-system controller can use the identified target cursor to perform the media management operation. By shifting from one cursor to the next cursor in the sequential order, the memory sub-system controller stores data that has similar life expectancy within the same MUs, thus accounting for the age of data.

The value of temporal metric of data can correspond to the age of the data, which can reflect the likelihood that the data will be overwritten. Data exhibiting high temporal metric values is more likely to be overwritten than data exhibiting low temporal metric values. By grouping data based on the value of the temporal metric of the data, the pages on management unit should be invalidated at the approximately the same rate as each other, thus reducing the number of re-write operations performed during a media management operation. By avoiding storing "cold" data and "warm" data on the same management unit, the occurrences of having to re-write "cold" data repeatedly in order to free a management unit that stores both "cold" and "warm" data are reduced. This reduction in media management operations, and/or in the number of re-write operations performed during media management operations, results in a reduction in the write amplification factor.

Advantages of the present disclosure include, but are not limited to, reducing the write amplification factor for memory devices, thus extending the lifecycle of the memory device and improving the overall performance of the memory sub-system. More specifically, aspects of the present disclosure reduce the number of backend write operations performed during media management operations. Since memory devices can generally be written to, read from, and/or erased a finite number of times before physical wear causes the memory device to become unreliable and/or fail, reducing the number of backend write operations leads to an increase in the lifecycle of the memory device. Furthermore, backend write operations performed during media management operations consume resources that could otherwise be used for other operations. Thus, by reducing the number of backend operations, aspects of the present disclosure enhance the overall performance of the memory sub-system. Aspects of the present disclosure reduce the write amplification factor using an inexpensive method that can be implemented with no modifications to the host system software or hardware.

Figure 1:
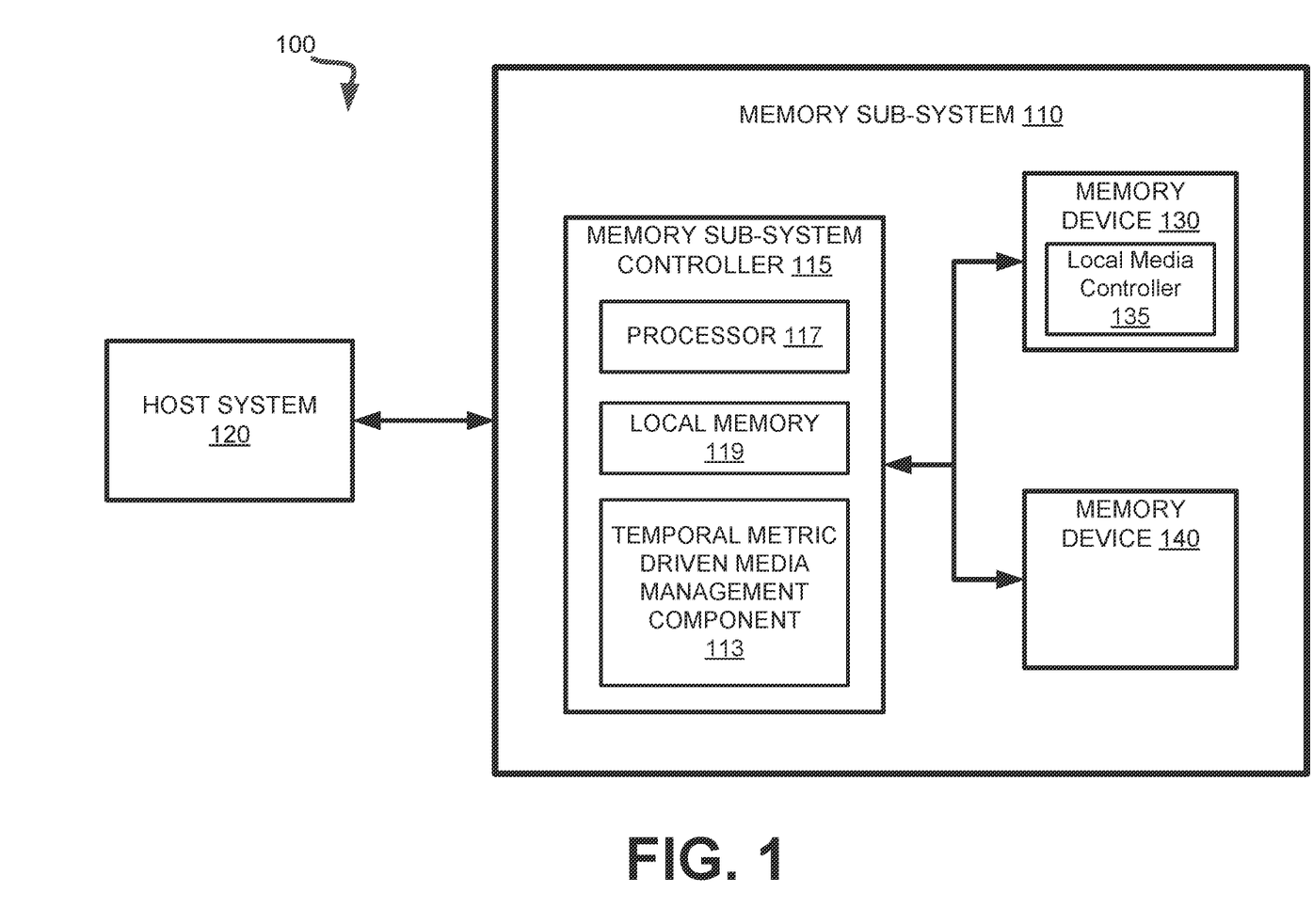
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a temporal metric driven media management component 113 that can utilize multiple cursors to perform media management operations based on the value of temporal metric of the valid data. In some embodiments, the memory sub-system controller 115 includes at least a portion of the temporal metric driven media management component 113. In some embodiments, the temporal metric driven media management component 113 is part of the host system 120, an application, or an operating system. In other embodiments, local media controller 135 includes at least a portion of temporal metric driven media management component 113 and is configured to perform the functionality described herein.

The temporal metric-driven media management component 113 can perform media management (e.g., garbage collection) operations using multiple media management cursors. The memory sub-system controller 115 can maintain multiple cursors. For example, the memory sub-system controller 115 can store a data structure (e.g., in local memory 119) that includes a list of the cursor identifiers and an indicator specifying each cursor's use. The memory sub-system controller 115 can allocate a first subset of the cursors for operations received from the host system 120, and can allocate a second subset of the cursors for back-end operations performed within the memory sub-system 110. Backend operations can include, for example, media management operations including garbage collection operations. The temporal metric driven media management component 113 can utilize a subset of the cursors as media management cursors numbered sequentially, and can associate each media management cursor with a range of values of a chosen temporal metric. Thus, the memory sub-system controller 115 can maintain a data structure that lists the subset of media management cursors. The data structure can include, for each of the media management cursor, a cursor identifier, as well as an indicator specifying the range of values of the temporal metric corresponding to the cursor.

As an illustrative example, the temporal metric driven media management component 113 can maintain four media management cursors, each one corresponding to a range of values of a chosen temporal metric of the data to be managed (e.g., garbage collected). The temporal metric can represent an age characteristic of the valid data, such as the time elapsed since the data was programmed, and/or a timestamp indicating the most recent write corresponding to the valid data. Note that other metrics can be used to represent the temporal metric of valid data. In some embodiments in which the temporal metric reflects the timestamp indicating the most recent write corresponding to the data, data exhibiting high values of a chosen temporal metric (i.e., most recently written data) can be referred to as "hot" data, while data exhibiting low values of a chosen temporal metric can be referred to as "cold" data. For example, the temporal metric can be split into four ranges of values. The range of the highest values can refer to "warm" data, the range of the second highest values can refer to "cool" data, the range of the third highest values can refer to "cold" data, and the range of the fourth highest values can refer to "frozen" data. Note that there can be more or fewer ranges of temporal metric values. Thus, one media management cursor can be used for "warm" data, one can be used for "cool" data, one can be used for "cold" data, and one can be used for "frozen" data, for example.

In some embodiments, the temporal metric can be based on, for example, a time after programming metric of the data. The time after program (TAP) can refer to the time elapsed since a cell has been programmed. The TAP can be estimated (e.g., inference from a data state metric), or directly measured (e.g., from a controller clock). A management unit (e.g., cell, block, page, superblock, etc.) can be classified as "warm" if it has a (relatively) small TAP, and "cold" (or, comparatively, colder) if it has a (relatively) large TAP. In some embodiments, the temporal metric can be based on, for example, a counter value reflecting the number of times the data has been written (or re-written, e.g., due to a media management operation such as garbage collection). The temporal metric driven media management component 113 can increment the value of the counter associated with the data each time it is re-written.

In some embodiments, the temporal metric driven media management component 113 can include a management unit (MU) access tracker that can determine the value of the temporal metric of data. The temporal metric value of data can be measured according to any of a number of parameters, including, for example, the recency of data writes directed to a given memory page. Thus, in one implementation, the MU access tracker can increment a counter each time a given MU is written to. In another implementation, the MU access tracker can determine how many of those data writes occurred in a given period of time (e.g., the last minute, the last hour, the last 24 hours). In another implementation, the MU access tracker can maintain a timestamp or other value indicating when a most recent data write occurred or how much time has passed since a most recent data write of a given MU. In one implementation, the values of the chosen temporal metric of data can be measured using a combination of two or more of these or other parameters. The MU access tracker can then allocate a value of the temporal metric (or range of values of the temporal metric, e.g., "warm" or "cold") to the management unit. In some embodiments, the value of temperature metric can be stored in metadata associated with the management unit.

A media management operation (e.g., garbage collection) can include reading valid data from a victim management unit, and writing the data to a target management unit. The target management unit can be referenced by a target media management cursor. In some embodiments, the temporal metric driven media management component 113 can identify the target media management cursor based on the value of the chosen temporal metric of the valid data read from the victim management unit.

In some embodiments, the temporal metric driven media management component 113 can assign a sequential order to the media management cursors. Thus, when performing a media management operation, the temporal metric driven media management component 113 can identify the media management cursor used to write data to the victim management unit, and can identify the target media management cursor as the next media management cursor in the sequential order (i.e., the media management cursor immediately following, in the sequential order, the media management cursor associated with the victim management unit). In such embodiments, the memory sub-system controller 115 can store, in the data structure that includes a list of the cursor identifiers, the sequential order of the cursor identifiers.

Further details with regards to the operations of the temporal metric driven media management component 113 are described below.

Figure 2A:
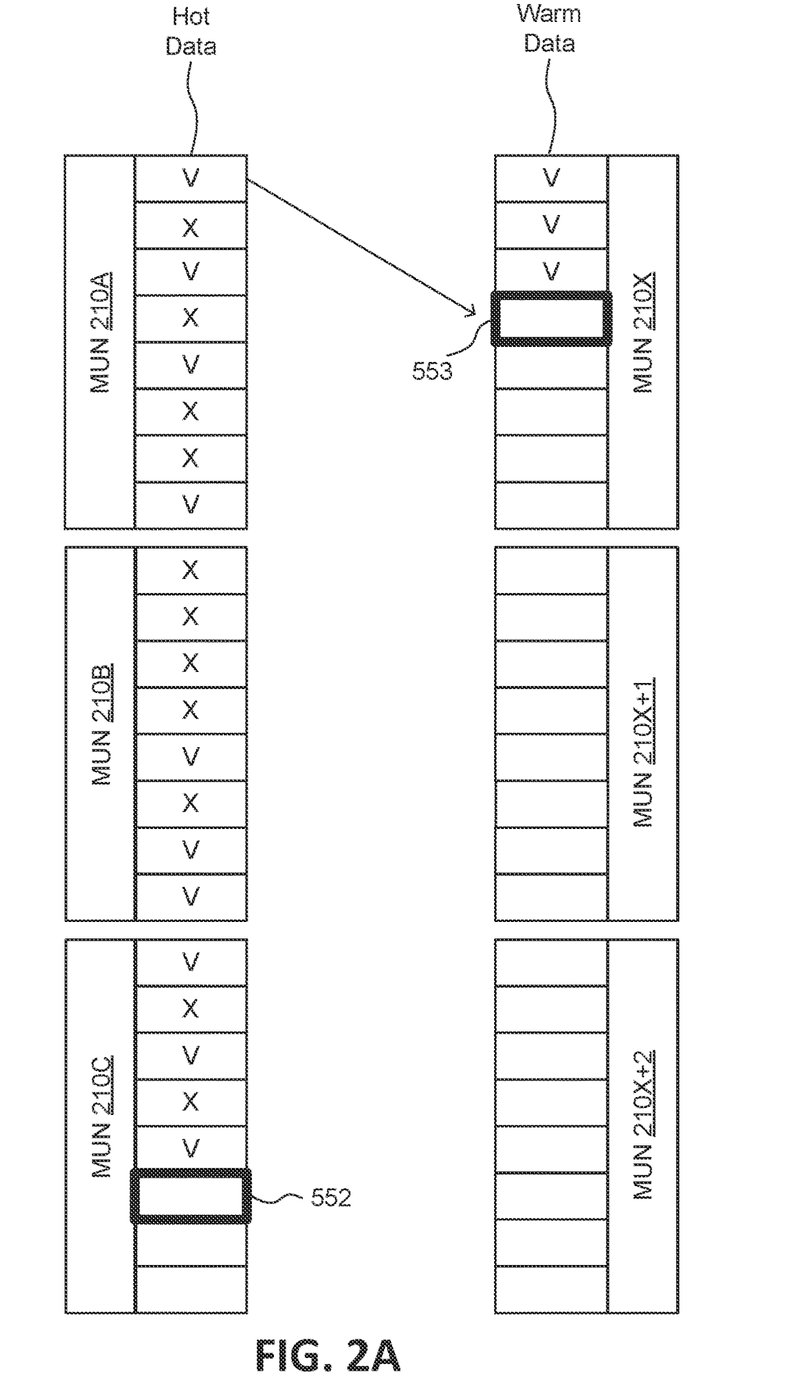
FIGS. 2A-2B depict an example of a media management operation implemented on hot data, in accordance with some embodiments of the present disclosure.
Figure 2B:
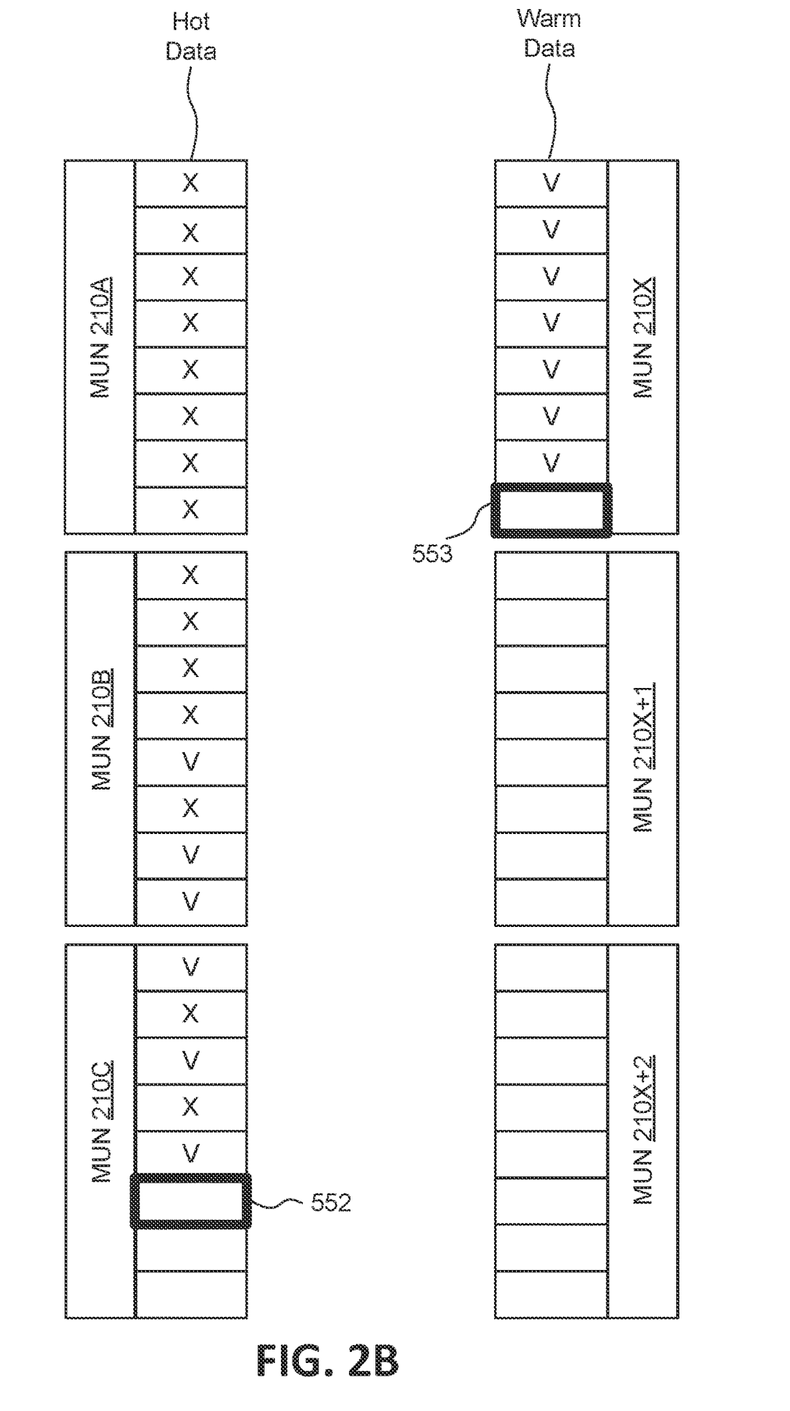
Figure 3:
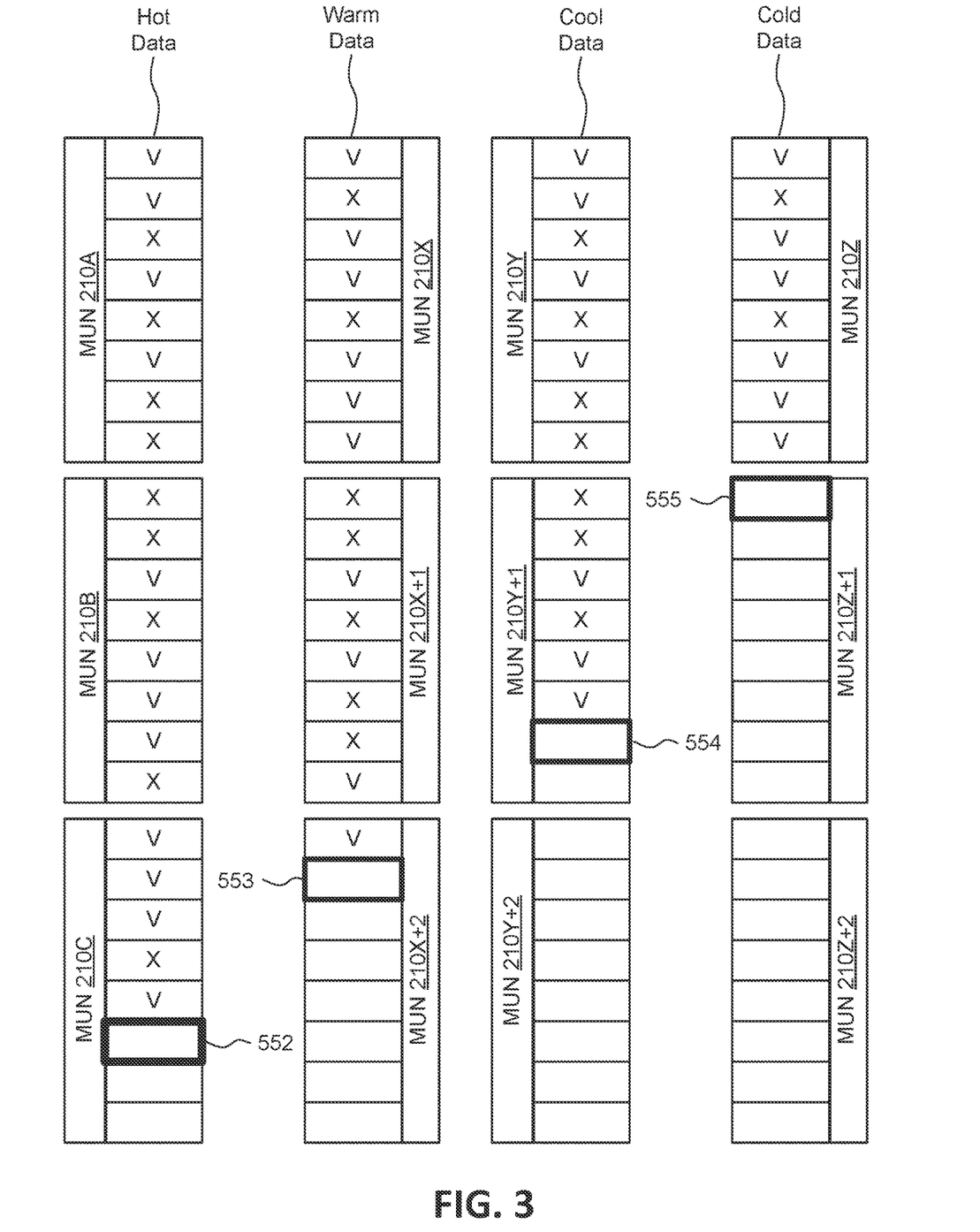
FIG. 3 illustrates a multiple media management cursors corresponding to the temporal metrics of stored data, in accordance, in accordance with some embodiments of the present disclosure.

FIGS. 2A-2B depict an example of a media management operation implemented on hot data, in accordance with some embodiments of the present disclosure. The example media management operation depicted in FIGS. 2A-2B is a garbage collection operation. FIGS. 2A-2B illustrate a number of management units, represented as management unit numbers (MUNs) 210A-210X+2. A management unit can be a block, for example. Each management unit includes 8 sub-units. A sub-unit can be a page, for example. As illustrated in FIGS. 2A-2B, and FIG. 3, a sub-unit with a "V" indicates that valid data is stored at that sub-unit, and a sub-unit with an "X" indicates that no valid data is stored at that sub-unit (e.g., the sub-unit has been marked as invalid). FIGS. 2A-2B also illustrates two cursors 552, 553. The cursor 552 is used to store data received from the host system, referred to as "hot" data. The cursor 553 can be one of several media management cursors. Cursor 553 can reference "warm" data, or data that has been garbage collected one time. The temporal metric driven media management component 113 can maintain a range of values of the chosen temporal metric for the "warm" data, such as data that has been re-written (e.g., due to garbage collection operations) once or twice. In some embodiments, the temporal metric driven media management component 113 can maintain a "cool" data media management cursor for data that has been re-written three or four times, can maintain a "cold" data media management cursor for data that has been re-written five or six times, and can maintain a "frozen" data media management cursor for data that has been re-written more than six times. Examples of media management cursors for "cool" and "cold" data are described below with respect to FIG. 3.

As an illustrative example illustrated in FIGS. 2A-2B, the temporal metric driven media management component 113 has initiated a garbage collection operation, and has identified MUN 210A as the management unit on which to perform the garbage collection operation (e.g., to be garbage collected). In some embodiments, the temporal metric driven media management component 113 identifies a management unit on which to perform a garbage collect operation based on the amount of valid data stored at the management unit. For example, MUN 210A has 4 sub-units storing valid data, while MUN 210B and MUN 210C have less than 4 sub-units storing valid dad. Other methods can be used to identify a management unit on which to perform garbage collection operations.

Upon initiating the garbage collection operation, the temporal metric driven media management component 113 identifies a media management cursor to use to complete the operation. In some embodiments, the temporal metric driven media management component 113 can determine the value of chosen temporal metric for the identified MUN 210A (e.g., representing an age characteristic of the valid data stored at the identified MUN 210A). The value of the chosen temporal metric can be, for example, the number of times the data has been written (or re-written), a timestamp indicating the most recent write of the data, and/or the time elapsed since the valid data was programmed (e.g., the TAP value). The values of the chosen temporal metric can be maintained by the memory sub-system controller 115, or can be determined by the temporal metric driven media management component 113. The temporal metric driven media management component 113 can then identify the media management cursor corresponding to the value (or the range of values) of the chosen temporal metric that includes the value of the temporal metric of the data stored at MUN 210A. As illustrated in FIG. 2A, the temporal metric driven media management component 113 can identify cursor 553 as corresponding to the temporal metric value of the valid data in MUN 210A.

In some embodiments, the temporal metric driven media management component 113 can maintain multiple media management cursors in sequential order. The temporal metric driven media management component 113 can maintain an identifier for each cursor, and metadata for a MUN 210A-210X+2 can store the cursor identifier for the cursor used to write the data to the respective MUN 210A-210X+2. In some embodiments, when writing data to a MUN 210A-210X+2, the temporal metric driven media management component 113 can update the metadata with cursor identifier used to perform the write command. For example, when writing data from the host system, the temporal metric driven media management component 113 can update the metadata of MUN 210A-C with the cursor identifier for cursor 552. Then, when performing a media management operation, the temporal metric driven media management component 113 can identify the target cursor as the cursor immediately following the cursor 552 in the sequential order. As illustrated in FIG. 2A, the next cursor in the sequential order is cursor 553.

The temporal metric driven media management component 113 can then write the data at the location referenced by cursor 553, i.e., MUN 210X. FIG. 2B illustrates MUN 210A-210X+2 after the completion of the garbage collection operation, in which the valid data from MUN 210A has been moved to MUN 210X. MUN 210A now does not store any valid data, and can be erased and reused by the memory sub-system controller. In some embodiments, MUN 210A can be reused to store "hot" data from the host system. In some embodiments, MUN 210A can be reused to store any data, and is not limited to storing "hot" data from the host system.

FIG. 3 illustrates multiple media management cursors 553-555 corresponding to the temporal metrics of the stored data, in accordance with some embodiments of the present disclosure. Cursor 553 is references "warm" data, cursor 554 references "cool" data, and cursor 555 references "cold" data. Note that there can be fewer or additional media management cursors than those illustrated in FIGS. 2A-2B, 3. Cursor 552 references "hot" data received from the host system.

In some embodiments, when the temporal metric driven media management component 113 initiates a garbage collection operation on MUN 210X+1, for example, the temporal metric driven media management component 113 can identify the value of the chosen temporal metric of the valid data stored at MUN 210X+1 to identify which media management cursor 553-555 to use. In some embodiments, the temporal metric driven media management component 113 can identify the cursor identifier stored in metadata for MUN 210X+1 to identify media management cursor 554 as the next cursor in the sequential order. Hence, when performing a media management operation on MUN 210X+1 (or any other "warm" data, e.g., MUN 210X, 210X+2) the temporal metric driven media management component 113 can associate the valid data stored in MUN 210X+1 with media management cursor 554, and can write the valid data to MUN 210Y+1. Similarly, when performing a media management operation on "cool" data MUN 210Y-210Y+2, the temporal metric driven media management component 113 can associate valid data with media management cursor 555.

In some embodiments, the temporal metric driven media management component 113 can maintain three media management cursors, 553-555. Thus, media management cursor 555 can be the last media management cursor in the sequential order, and/or can correspond to the highest range of values of the chosen temporal metric (e.g., data that has been written (or re-written) more than 6 times). In such cases, the temporal metric driven media management component 113 can determine not to perform media management operations on MUN 210Z-210Z+2 that are associated with the last media management cursor. Since the coldest data is the least frequently modified, performing a media management operation on such data may not be necessary.

Figure 4:
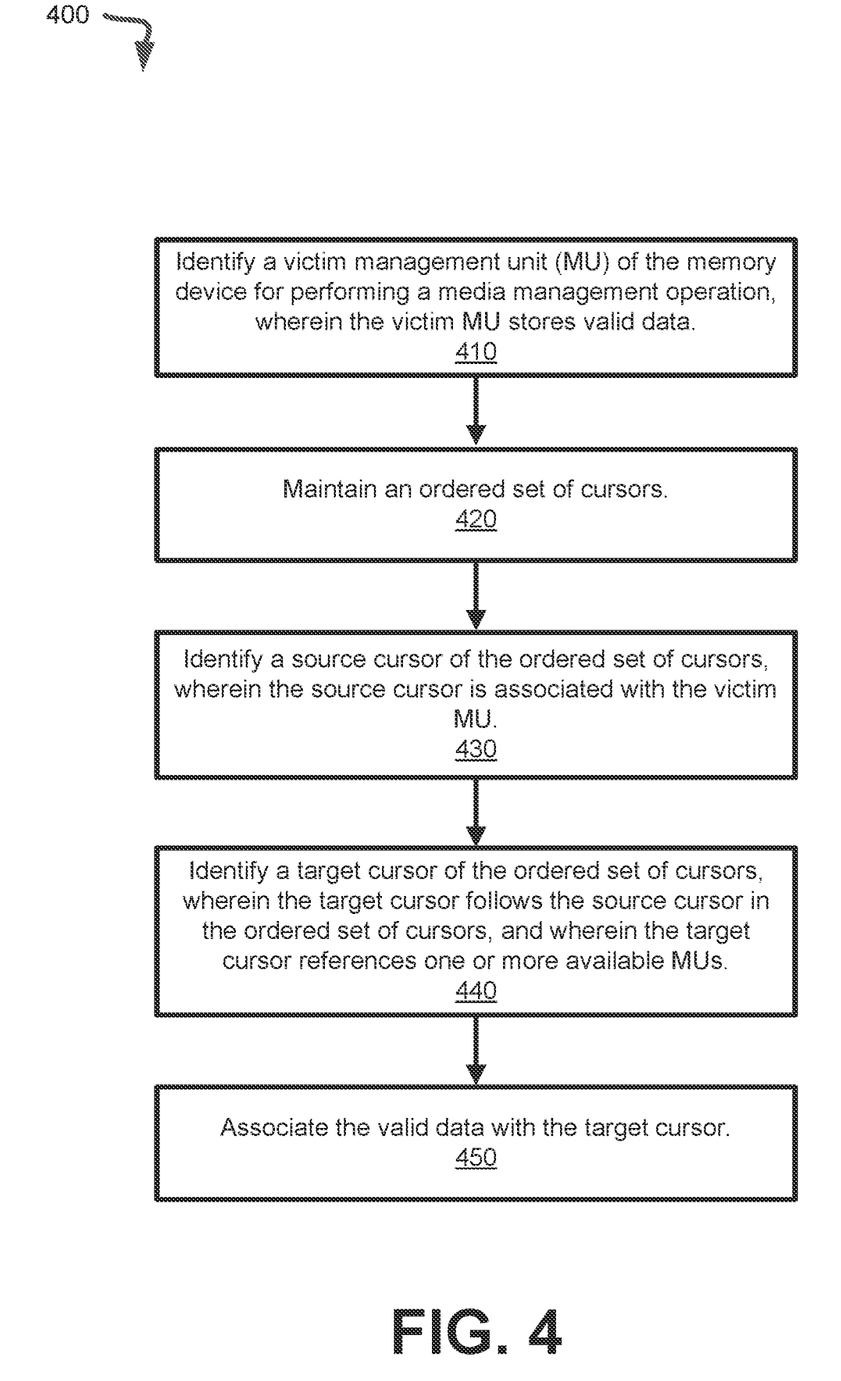
FIG. 4 is a flow diagram of an example method to perform a temporal metric driven media management operation, in accordance with some embodiments of the present disclosure.

FIG. 4 is a flow diagram of an example method 400 to perform a temporal metric driven media management operation, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the temporal metric driven media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic identifies a victim management unit (MU) of a memory device for performing a media management operation. The victim MU stores valid data. The victim MU can be associated with a source logical address, and the source logical address can correspond to a source cursor. The victim MU can have a corresponding value of a temporal metric of the valid data stored at the victim MU. In some embodiments, the temporal metric can reflect the number of times the data has been written (or re-written), the time elapsed since the data was programmed at the MU (i.e., the time after programming (TAP)), and/or a timestamp indicating the most recent access (e.g., write) of the valid data. In some embodiments, the temporal metric can be can include a version counter that is incremented each time the MU is written to a memory device and can be used to determine a relative age of the MU.

At operation 420, the processing logic maintains an ordered set of cursors. Each cursor in the ordered set corresponds to a respective range of values of the temporal metric of data referenced by the cursor. Thus, the multiple cursors are arranged in a sequential order of respective ranges of values of the temporal metric. For example, the processing logic can maintain three cursors in sequential order. The first cursor can reference the "warm" data, referencing data with the most recent timestamp, for example; the second cursor can reference "cool" data, referencing data with a timestamp that falls between two thresholds; and the third cursor can reference "cold" data, referencing data with the least recent timestamp. The first cursor can reference the second cursor as the next cursor in the sequential order, and the second cursor can reference the third as the next cursor in the sequential order. In some embodiments, the reference to the next cursor in the sequential order can be stored in local memory (e.g., local memory 119 of FIG. 1). In some embodiments, the ordered set of cursors are labeled sequentially, and the processing logic applies a modulo N to the result, where N is the number of cursors in the ordered set. It should be noted that fewer or more than three cursors can be maintained.

At operation 430, the processing logic identifies a source cursor of the ordered set of cursors. The identified source cursor is associated with the victim MU as being the cursor used to write the data at the victim MU. In some embodiments, the processing logic identifies metadata associated with the victim MU, and identifies the cursor identifier, in the metadata associated with the victim MU, corresponding to the source cursor. At operation 440, the processing logic identifies a target cursor of the ordered set of cursors. The target cursor references one or more available MUs. The target cursor follows the source cursor in the sequential order. In some embodiments, to identify the target cursor, the processing logic identifies a value of the temporal metric of the valid data. The processing logic then identifies the target cursor associated with a range of values including the value of the temporal metric of the valid data.

In some embodiments, the MUs of the memory device can be associated with one of the cursors. For example, the metadata of a MU of the memory device can store an indicator indicating an association with one of the cursors. The processing logic can identify a source cursor associated with the source logical address of the victim MU, e.g., using the metadata associated with the MU. The processing logic can then identify the target cursor as the next cursor in the sequential order. For example, the cursor associated with the source logical address can be the first cursor referencing "warm" data, in which case the processing logic can identify the second cursor referencing "cool" data as the target cursor.

In some embodiments, the cursor associated with the source logical address can be the last cursor in the ordered set of cursors. In such case, at operation 440, the processing logic can identify the source cursor as the target cursor. That is, the source cursor is the same as the target cursor.

At operation 450, the processing logic associates the valid data with the target cursor identified at operation 440. The processing logic can further write the valid data at the one or more available MUs referenced by the target cursor. The processing logic can further erase the victim MU, and mark the victim MU as free.

Figure 5:
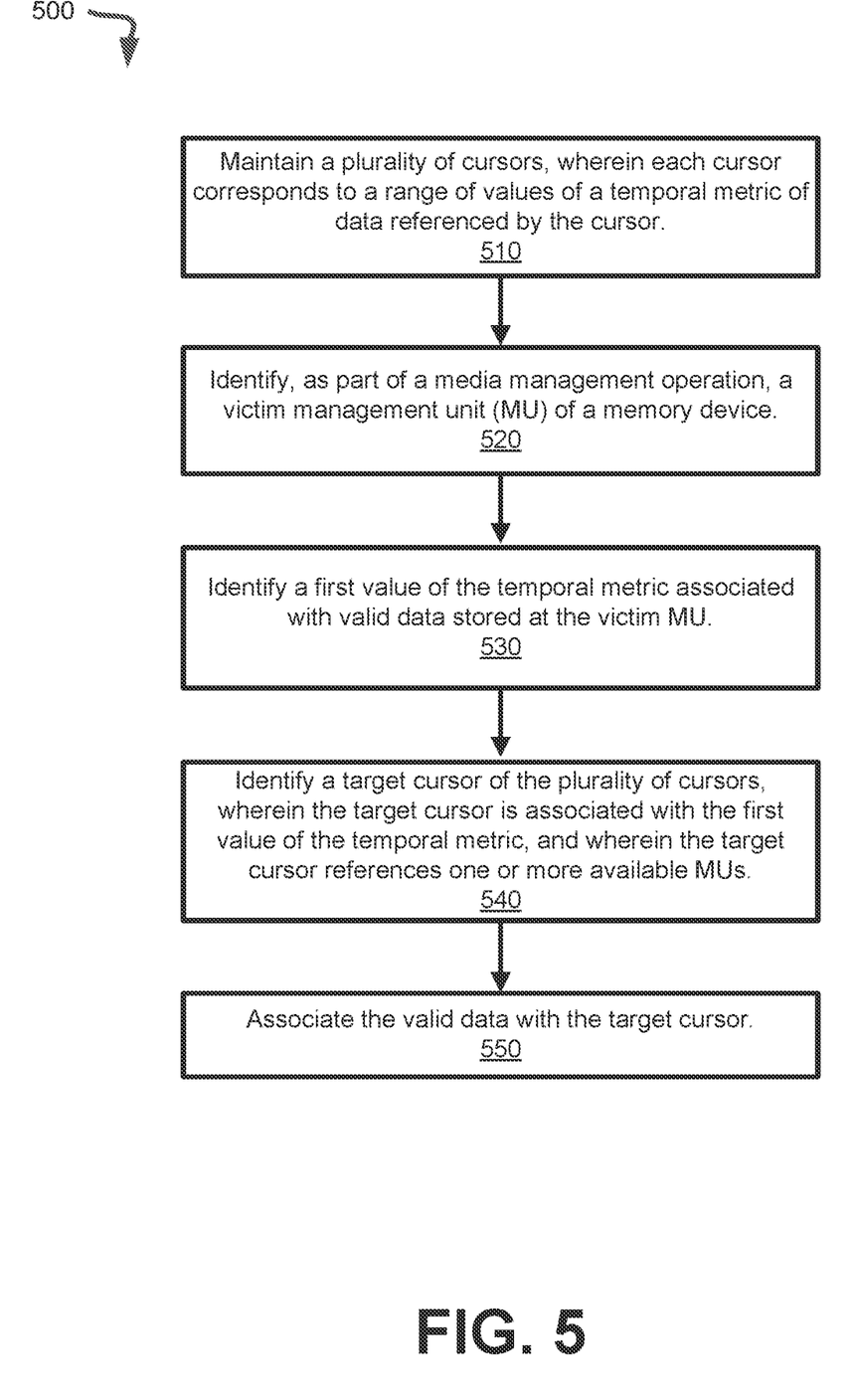
FIG. 5 is a flow diagram of an example method to perform a media management operation using a cursor corresponding to the temporal metric value of the valid data, in accordance with some embodiments of the present disclosure.

FIG. 5 is a flow diagram of an example method 500 to perform a media management operation (e.g., a garbage collection operation) using a cursor corresponding to the temporal metric value of the valid data, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the temporal metric driven media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic maintains multiple cursors, each cursor corresponding to a range of values of a temporal metric of data referenced by the cursor. The temporal metric of the data referenced by each cursor can reflect the number of times the data has been written (and/or re-written, e.g., due to a media management operation such as garbage collection). For example, the "warm" cursor can reference data that has been written (and/or re-written, e.g., due to a media management operation such as garbage collection) one time, the "cool" cursor can reference data that has been written and/or re-written two to three times, and the "cold" cursor can reference data that has been re-written and/or re-written four or more times.

At operation 520, the processing logic identifies, as part of a media management operation, a victim MU of a memory device. The victim MU stores valid data. The victim MU can be associated with a source logical address, and the source logical address can correspond to a source cursor. The victim MU can be selected based on a combination of parameters, including, for example, the ratio of valid to invalid data stored at the MU.

At operation 530, the processing logic identifies a first value of the temporal metric of the valid data stored at the victim MU. The value of the temporal metric can identify pages as hot, warm, cool, or cold, for example, based on the number of times the valid data has been written and/or re-written.

At operation 540, the processing logic identifies a target cursor corresponding to the first value of the temporal metric. The target cursor references one or more MUs available to store the valid data. Thus, to identify the target cursor, the processing logic identifies a value of the temporal metric of the valid data. The processing logic then identifies the target cursor associated with a range of values including the value of the temporal metric of the valid data.

In some embodiments, responsive to determining that the value of the temporal metric exceeds a maximum temperature value, the processing logic removes the victim MU from the media management operation. That is, the processing logic can determine not to perform a media management operation on a MU that stores "frozen" data, or data that exceeds the temporal metric for the cursor referencing the coldest data.

At operation 550, the processing logic associates the valid data from the victim MU with the target cursor. The processing logic then writes the valid data at the one or more available MUs referenced by the target cursor. The processing logic can erase the victim MU, and mark the victim MU as free. In some embodiments, responsive to associating the valid data with the target cursor, the processing logic increments the first value of the temporal metric associated with the valid data (e.g., by a value of 1).

Figure 6:
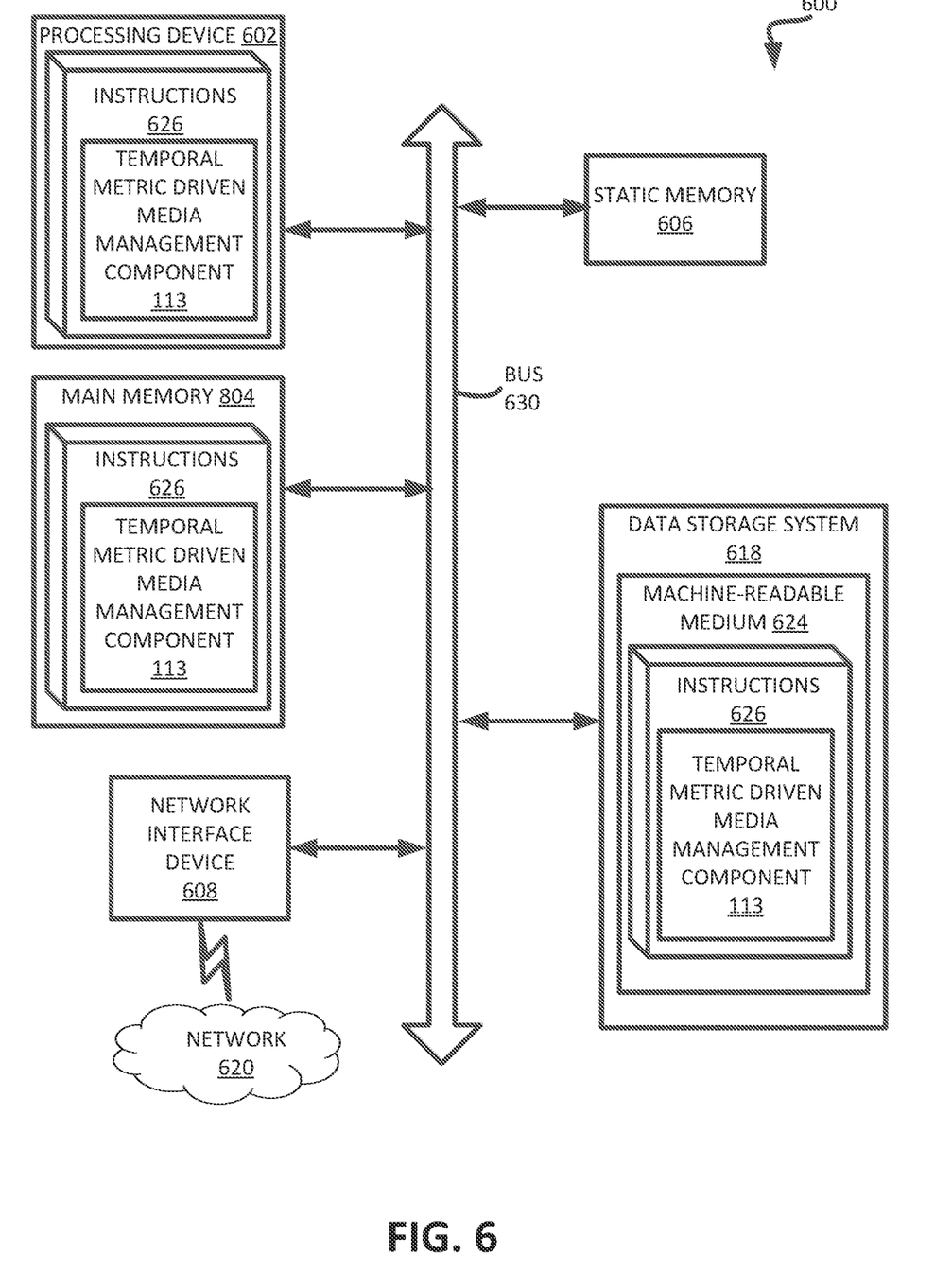
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the temporal metric driven media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a temporal metric driven media management component (e.g., the temporal metric driven media management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to perform operations comprising:
   identifying a victim management unit (MU) of the memory device for performing a media management operation, wherein the victim MU stores valid data;
   maintaining an ordered set of cursors, wherein a cursor in the ordered set of cursors corresponds to a respective range of values of a temporal metric of data referenced by the cursor, and wherein the temporal metric represents an age characteristic of the data referenced by the cursor;
   identifying a source cursor of the ordered set of cursors, wherein the source cursor is associated with the victim MU;
   identifying a target cursor of the ordered set of cursors, wherein the target cursor follows the source cursor in the ordered set of cursors, and wherein the target cursor references one or more available MUs; and
   associating the valid data with the target cursor.

2. The system of claim 1, wherein the operations further comprise:
writing the valid data at the one or more available MUs referenced by the target cursor.

3. The system of claim 1, wherein the victim MU is associated with a source logical address, and wherein the source cursor corresponds to the source logical address.

4. The system of claim 1, wherein the operations further comprise:
responsive to determining that the source cursor is a last cursor in the ordered set of cursors, identifying the source cursor as the target cursor.

5. The system of claim 1, wherein the ordered set of cursors is arranged in a sequential order of respective ranges of values of the temporal metric.

6. The system of claim 5, wherein the temporal metric reflects at least one of: a time after programming (TAP) associated with the valid data or a timestamp indicating a most recent access of the valid data.

7. The system of claim 1, wherein identifying the source cursor further comprises:
identifying metadata associated with the victim MU; and
identifying, in the metadata associated with the victim MU, a cursor identifier corresponding to the source cursor.

8. The system of claim 1, wherein the operations further comprise:
erasing the victim MU; and
marking the victim MU as free.

9. A method comprising:
maintaining a plurality of cursors, wherein a cursor corresponds to a range of values of a temporal metric of data referenced by the cursor, wherein the temporal metric represents an age characteristic of the data referenced by the cursor;
identifying, as part of a media management operation, a victim management unit (MU) of a memory device;
identifying a first value of the temporal metric associated with valid data stored at the victim MU;
identifying a target cursor of the plurality of cursors, wherein the target cursor is associated with the first value of the temporal metric, and wherein the target cursor references one or more available MUs; and
associating the valid data with the target cursor.

10. The method of claim 9, further comprising:
writing the valid data at the one or more available MUs referenced by the target cursor.

11. The method of claim 9, wherein the temporal metric of the data referenced by the cursor reflects a number of times the valid data has been written.

12. The method of claim 9, further comprising:
responsive to associating the valid data with the target cursor, incrementing the first value of the temporal metric associated with the valid data.

13. The method of claim 9, further comprising:
responsive to determining that the first value of the temporal metric exceeds a maximum metric value, removing the victim MU from the media management operation.

14. The method of claim 9, further comprising:
erasing the victim MU; and
marking the victim MU as free.

15. A non-transitory computer-readable storage medium comprising instructions that, when executed by a processing device, cause the processing device to perform operations comprising:
identifying a victim management unit (MU) of a memory device for performing a media management operation, wherein the victim MU stores valid data;
maintaining an ordered set of cursors, wherein a cursor in the ordered set of cursors corresponds to a respective range of values of a temporal metric of data referenced by the cursor, and wherein the temporal metric represents an age characteristic of the data referenced by the cursor;
identifying a source cursor of the ordered set of cursors, wherein the source cursor is associated with the victim MU;
identifying a target cursor of the ordered set of cursors, wherein the target cursor follows the source cursors in the ordered set of cursors, and wherein the target cursor references one or more available MUs; and
associating the valid data with the target cursor.

16. The non-transitory computer-readable storage medium of claim 15, wherein the operations further comprise:
writing the valid data at the one or more available MUs referenced by the target cursor.

17. The non-transitory computer-readable storage medium of claim 15, wherein the victim MU is associated with a source logical address, and wherein the source cursor corresponds to the source logical address.

18. The non-transitory computer-readable storage medium of claim 15, wherein the operations further comprise:
responsive to determining that the source cursor is a last cursor in the ordered set of cursors, identifying the source cursor as the target cursor.

19. The non-transitory computer-readable storage medium of claim 15, wherein the temporal metric reflects at least one of a time after programming (TAP) associated with the valid data or a timestamp indicating a most recent access of the valid data, and wherein the ordered set of cursors are arranged in a sequential order of respective ranges of values of the temporal metric.

20. The non-transitory computer-readable storage medium of claim 15, wherein the operations further comprise:
   erasing the victim MU; and
   marking the victim MU as free.

* * * * *